United States Patent
Remaud et al.

[15] 3,703,320
[45] Nov. 21, 1972

[54] BRAKING SYSTEM CONTROL AND ANTI-LOCK DEVICES

[72] Inventors: Jacques C. Remaud; Pierre Bouthors, both of Billancourt, France

[73] Assignees: Regie Nationale des Usines Renault, Billancourt; Automobiles Peugeot, Paris, France

[22] Filed: Oct. 2, 1970

[21] Appl. No.: 77,589

[30] Foreign Application Priority Data

Oct. 17, 1969 France ................6935756

[52] U.S. Cl..............................................303/21 F
[51] Int. Cl. ................................................B60t 8/06
[58] Field of Search ...303/21 F, 21 B, 21 BE, 21 BB, 303/21 EB

[56] References Cited

UNITED STATES PATENTS

| | | |
|---|---|---|
| 3,520,576 | 7/1970 | Okamoto et al. ......303/21 BE |
| 2,170,237 | 8/1939 | Farmer et al. .........303/21 BE |
| 3,301,608 | 1/1967 | Harned et al. .........303/21 BE |

*Primary Examiner*—Richard E. Aegerter
*Assistant Examiner*—H. Lane
*Attorney*—Stevens, Davis, Miller & Mosher

[57] ABSTRACT

This anti-lock device for the wheels of motor vehicles comprises a detector adapted to transmit a signal proportional to the slip of a wheel, a member for modulating said signal which is interposed between a source of vacuum and an expansion unit of the braking circuit. Said detector is adapted to compare two signals of which the magnitudes are proportional to the momentary speed of the wheel and to the real speed of the vehicle in relation to the ground, respectively, so as to energize said modulating member.

5 Claims, 4 Drawing Figures

BRAKING SYSTEM CONTROL AND ANTI-LOCK DEVICES

The present invention relates in general to automatic means for controlling brake applications and anti-lock means for the wheels of motor vehicles, and is concerned more particularly with a device adapted to control the braking force or pressure, irrespective of the speed of the road wheel, especially in case the latter tends to become locked.

Mechanically or electrically controlled devices have already been proposed for braking systems of motor vehicles, for the purpose of preventing or discontinuing as rapidly as possible the locking or one or a plurality of wheels of a vehicle during a brake application while maintaining a sufficient efficiency of the braking system. To this end, the fluid pressure transmitted to the brake cylinders is controlled, under these conditions, by members responsive to the locked condition of the road wheels. As a rule, these devices are relatively complicated and some of them operate only in conjunction with a servo-action brake control system.

In other known devices a member adapted to control the wheel movement transmits to the brake control system an impulse such that this system vents to the atmosphere one fraction of the fluid contained in the brake transmission pipe lines in order to reduce the braking effort and thus prevent the locking of the road wheels. A known proposition consists in adding to the brake mechanism an inertia detector responsive to the wheel deceleration and means controlled by said detector for cutting off the brake control circuit when the deceleration value corresponds to the threshold of an incipient wheel locking effect. When the wheel rotates again the braking pressure is restored and the cycle of operation is resumed.

Now, the operation of these last-mentioned devices is disturbed both by the inherent frequency of the suspension system and by the stray accelerations due to the road outline ; since it is not known so far to incorporate filter means, or introduce correcting parameters, the use of these devices is extremely reduced.

Devices of this character are also objectionable in that they operate according to the "hit or miss" rule, thus causing a loss of efficiency in the braking system and an abnormal consumption of brake fluid, so that their use is confined in general to the rear axle. This limitation is objectionable in itself for it impairs the steering precision, since the locking of the front wheels cannot be avoided.

Other devices are known which do not operate according to said "hit and miss" rule and are effective between two thresholds, i.e. a deceleration threshold of the braked wheel and a re-acceleration thereof. The wheel accelerations are measured from the wheel speed, the latter being measured by means of proximity pick-ups or tachometric generators.

Other electronic devices are based on the principle of a comparison between the speeds or decelerations of the wheels at the speed or deceleration of one of them selected as being the fastest wheel.

The chief drawback of these devices is that they do not detect the decelerations or the differential speeds on prematurely locked, wheels, for the detection means incorporated in these devices operate only during the wheel rotation. Since the response time of these devices is not zero, they cannot prevent the locking of the wheels before the device becomes operative. This is observed for example, in case of a sudden brake application on a slippery road. The pressure builds up with a very steep gradient in the fluid circuit and will overstep very rapidly and considerably the limit value corresponding to the locking of the wheel.

More improved devices are also known which comprise means for measuring at any time the difference between the angular speed of the wheel and that of a so-called memory member.

This device, described and illustrated in the French Pat. No. 1.198.721, comprises a tachometric member rotatably driven from the wheel through a freewheel mechanism, so that said tachometric member will continue to rotate by coasting when the wheel is braked or locked. This tachometric member adapted to measure the inherent angular speed of the wheel constitutes a "memory" giving at any time the exact speed of the wheel at a previous moment.

The difference between the angular speed of the wheel and the velocity of said memory member may be converted without difficulty into a signal transformed in turn into a corresponding reduction in the braking fluid pressure.

This detection method, while avoiding the inconveniences characterizing the other known devices, did not become popular because it operates only within a very limited range of vehicle speeds.

In fact, if we assume that the memory member delivers a signal effective from $n$ r.p.m. ($n$ or absolute slip is the difference between the memorized speed N and the instantaneous wheel speed), the detection will be made with a relative slip (%) of $$n/N \times 100.$$

On the other hand, if the vehicle speed is reduced to $N/5$ as a consequence of a deceleration, a relative slip five times greater, i.e. $5\ n/M \times 100$, is obtained, assuming that the signal remains efficiently operative from $n$ r.p.m.

In other words, assuming that the detector becomes operative above a 10 percent slip (to which corresponds for example a memorized vehicle speed $N = 140$ km.p.h. or 87 m.p.h.), it is obvious that at 14 km.p.h. or 8.7 m.p.h. the detection will be effective only if the slip is as high as 100 percent, that is, if the wheel is locked.

These devices which, as already mentioned, are highly sensitive to the inherent frequency of the suspension system, operate with the desired preogressiveness only at relatively high speeds whereat the relative slip $n/N$ is relatively moderate.

Recent studies reported during the SAE Congress at Detroit (Communication No. 690,214) proved that the coefficient of adherence of tires to the road surface was closely related to the relative slip of the tire with respect to the road surface, and that the maximum tire efficiency was obtained when this slip was of the order of 15 to 20 percent in most instances.

It is the essential object of the present invention to provide an anti-lock device which is free of the inconveniences set forth hereinabove and wherein the braking pressure is subordinate to the value of the relative slip of a wheel in relation to the road surface, measured by comparison with the momentary wheel speed in relation to the road surface at the real speed of the vehicle in relation to the road.

It is another object of this invention to provide means for obtaining a maximum release of the braking circuit pressure when the wheel or wheels of the vehicle is or are locked accidentally.

A further object of this invention is to provide an anti-lock device adaptable to conventional braking circuits by utilizing the engine vacuum or manifold suction as an auxiliary source of power.

This device, comprising at least one detector adapted to transmit a signal of a magnitude proportional to the relative slip of a wheel with respect to the road surface from a predetermined value of said slip, an electromagnetic control member for modulating said signal, a source of vacuum and a braking circuit pressure release or expansion circuit, is characterized in that the detector making a comparison in a manner already known per se between signals of which the magnitudes are proportional to the momentary speed of the wheel in relation to the ground and to the real speed of the vehicle, respectively, energizes the modulating member interposed between said vacuum source and said braking circuit pressure release or expansion unit.

Other features and advantages of this invention will appear as the following description proceeds with reference to the attached drawings illustrating diagrammatically by way of example a typical form of embodiment of a device constructed according to the teachings of this invention.

Figure 1:
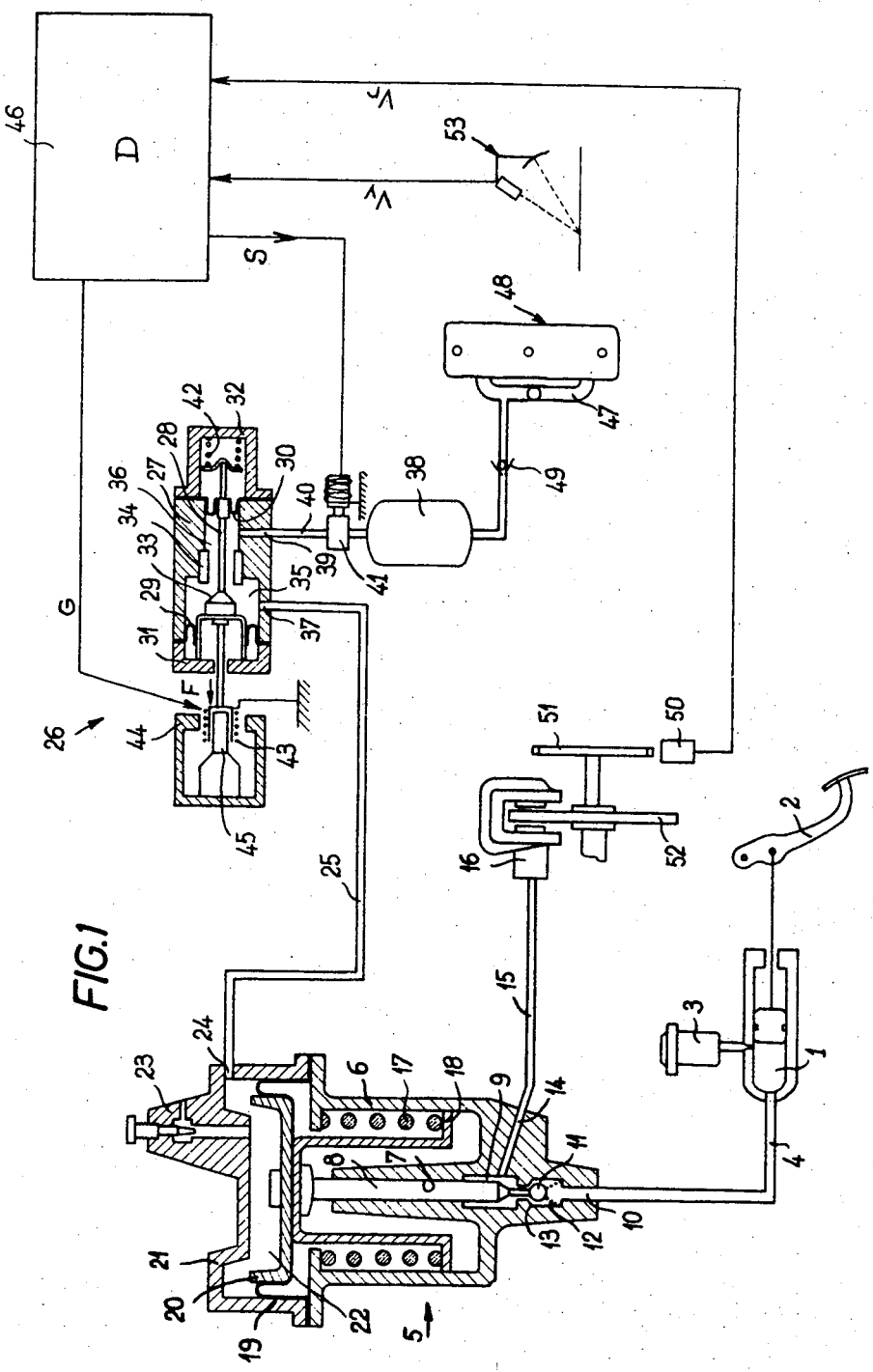
FIG. 1 illustrates the hydraulic, servo-controlled circuit of the device.
Figure 4:
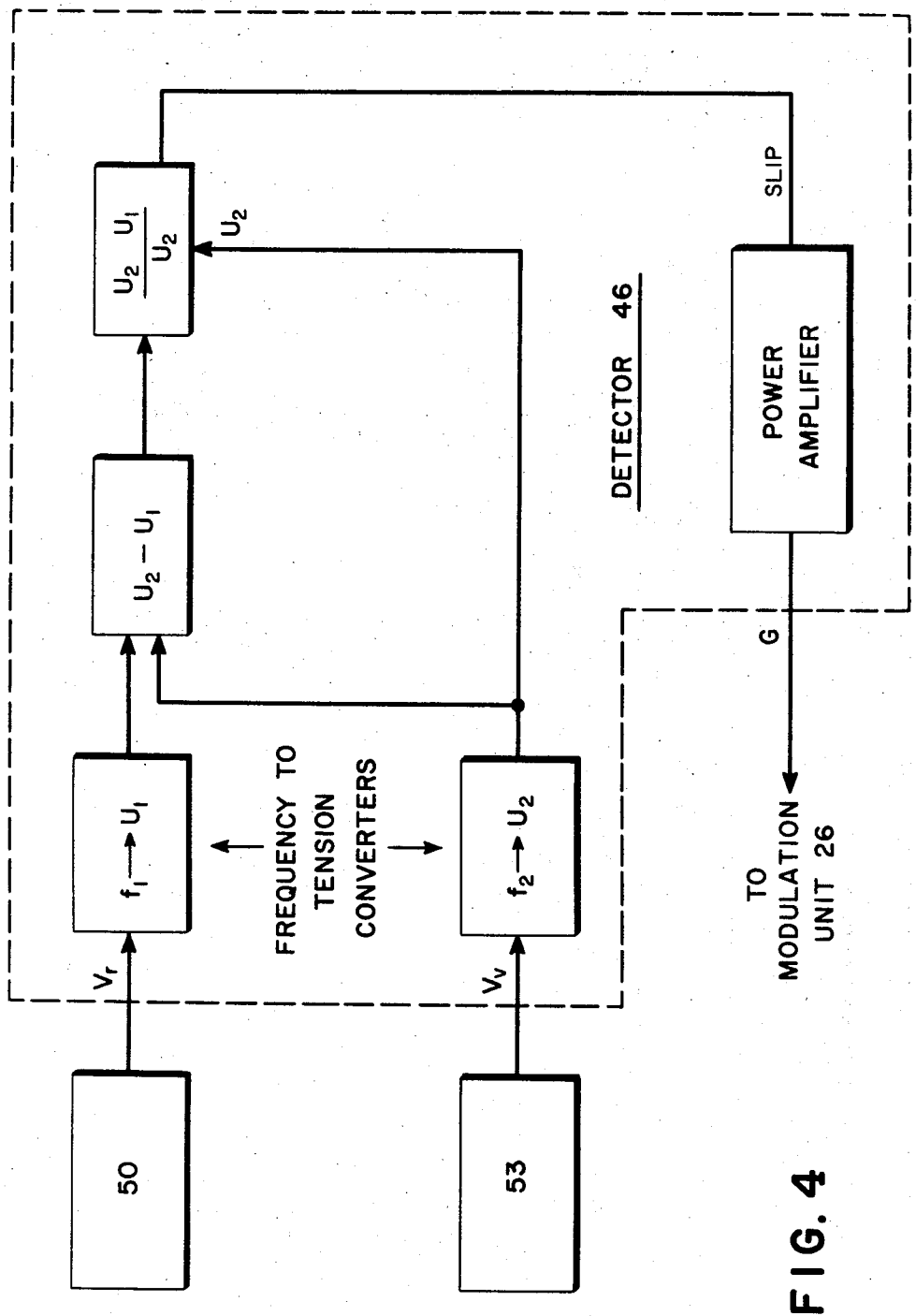

FIG. 4 schematically illustrates the detector 46 shown in FIG. 1.

Referring first to FIG. 1, a master-cylinder 1 actuated by a brake pedal 2 is supplied with hydraulic control fluid from a reservoir 3 and connected via a pipe line 4 to an expansion unit 5.

This expansion unit 5 comprises a body 6 formed with a central bore 7 in which an axial rod 8 is slidably mounted. An annular chamber 9 surrounding the lower end of rod 8 is separated from a fluid inlet port 10 by a ball valve 11 urged by a spring 12 against its seat 13.

An orifice 14 directs the braking fluid from chamber 9 via a pipe line 15 to the brake cylinder 16. A spring 17 reacts against an inner shoulder of body 6 and an outer flange of an inverted cup-shaped member 18 coaxial to and rigid with the rod 8. In order to reduce frictional contacts, a diaphragm 19 of the folding type is interposed between a bearing member 20 and said cup-shaped member 18, and has its outer peripheral edge clamped between a cap or cover 21 and said body 6.

A chamber 22 bounded by said diaphragm 19 and cover 21 may be vented to the surrounding atmosphere by means of an adjustable or gaged throttling passage 23, and connected to a modulating unit 26 through an orifice 24 and a pipe line 25. This modulating unit 26 is normally incorporated in the cover 21 of expansion unit 5, but in FIG. 1 it is represented separately in order to afford a clearer understanding of the mode of operation of the device.

The modulating unit 26 comprises a body 27 in which an axial valve stem 28 is slidably mounted and supported by a pair of folding diaphragm 29 and 30. These diaphragms are secured to the body 27 in a fluid tight manner by means of covers 31 and 32, respectively.

The valve stem 28 comprises a tapered valve element 33 adapted to engage a valve seat 34 and thus form two tandem chambers 35 and 36 bounded on either side of said valve element by said diaphragms 29 and 30.

These chambers 35 and 36 are connected, the former via an orifice 37 and said pipe line 25 to said expansion unit 5, and the latter via an orifice 39, a pipe line 40 and an electromagnet valve 41 to a source of vacuum 38. The stem 28 is urged to its valve opening position by a spring 42 of moderate force reacting against the cover 32, so that the normally open valve element 33 permits the free communication between chambers 35 and 36, under slip-free conditions, for a purpose to be explained presently.

The active surface of diaphragm 30 on the side of spring 42 is equal to that of the seat 34 of valve element 33. The active surface (i.e. the surface receiving the pressure force) of this diaphragm 30 is smaller than that of the other diaphragm 29, so that a vacuum produced in pipe line 40 will cause an axial movement of said stem 28 to the right, as seen in FIG. 1, thus compressing spring 42 and causing valve element 33 to engage its seat 34.

The left-hand end of stem 28 is rigid with a solenoid 43 movable in the magnetic field created across the poles 44 and 45 of a permanent magnet.

This solenoid 43 is energized through a detector 46 of which the function will be explained presently, so that it can attract the valve element 33 with a force F.

The vacuum source 38 is connected via a non-return valve 49 to the induction manifold 47 of engine 48.

The electromagnet valve 41 is energized from the detector 46 for a purpose to be explained presently.

The control device described hereinabove operates as follows, assuming that the detector 46 receives a signal $V_r$ proportional to the speed of the braked wheel and a signal $V_v$ proportional to the speed of the vehicle. This device known per se consists of an electronic computer adapted to transmit an amplified output signal G proportional to the relative wheel slip on the road surface. This signal is fed to the terminals of the movable solenoid 43 of modulating unit 26. When the threshold S of this signal is overstepped, the electromagnet valve 41 can be energized and thus caused to produce a vacuum in the orifice 39 of modulating unit 26, thus avoiding a waste of vacuum as long as the slip is inferior to the threshold of operation of said electromagnet valve 41.

FIG. 4 schematically illustrates the signals $V_r$ and $V_v$ input into detector 46 from pick-up 50 and probe 53, respectively. The detector 46 comprises a computer which converts the input signals $V_r$ (having frequency $f_1$) and $V_v$ (having frequency $f_2$) into signals $U_1$ and $U_2$, respectively, which are compared as shown by the schematic flow diagram in FIG. 4, to derive the relative wheel slip, which is amplified into an output signal G and fed to the modulating unit 26.

The wheel speed pick-ups are of any known type such as, for instance, a proximity pick-up 50 associated with a toothed wheel 51 driven from the brake disk 52 of the relevant wheel.

The speed of the vehicle in relation to the road may be measured by using Doppler-effect probes well known in the aircraft technique and shown only diagrammatically at 53 in FIG. 1.

This device operates cyclically and each cycle may be divided into a number of phases as follows:

a. Brake application

As long as the slip remains below the predetermined threshold the device is inoperative and the braking pressure is transmitted directly to the brake cylinder 16 as the fluid can flow freely past the ball valve 11 of expansion unit 5, the ball valve being unseated by the lower portion of rod 8 urged by spring 17.

b. Braking circuit expansion

If said predetermined slip threshold (6 to 8 percent) is overstepped the electromagnet valve 41 will direct the vacuum action to the demodulator 26. Thus, this demodulating unit 26 will supply vacuum to expansion unit 5 at a value proportional to said 6 or 8 % slip. Under these conditions, the vacuum value in chamber 22 of expansion unit 5 will be responsive to the slip value, especially if the latter increases.

The force F generated by the current in the solenoid 43 disposed in the magnetic field will increase and thus add itself to the force of spring 42.

The value of the vacuum produced in chamber 22 of unit 5 will increase in the same proportions and the movable assembly 18, 19, 20 and 8 of unit 5 will be attracted upwards, thus compressing the spring 17. The stroke of rod 8 is subordinate to the vacuum and therefore to the wheel slip.

During this movement the rod 8 firstly releases the ball valve 11 which is thus seated by spring 12 to isolate the mastercylinder 1. Then, as it continues its stroke, this rod 8 releases an additional volume in chamber 9 to permit the expansion of pipe line 15 and brakes 16. Thus, the wheel can rotate again; as the slip is reduced the voltage fed to solenoid 43 decreases in proportion and the effort generated by this solenoid, plus the force of spring 42, will no more balance the effort exerted on the diaphragms by the vacuum still prevailing in chamber 22 of expansion unit 5, so that the valve element 33 will re-engage its seat 34.

c. Recompression

As the chamber 22 is no more fed from the modulator and air is delivered with a low output controlled by throttle 23, the movable assembly 18, 19, 20 and 8 will move downwards and rod 8 will recompress the fluid in chamber 9 controlling the delivery of braking fluid to the brake cylinder 16.

As the rate at which the fluid pressure is now controlled by the throttling passage 23, not by the driver of the vehicle, this pressure will increase until, with the new slip increment, the modulator 26 can again supply vacuum to the expansion unit 5.

Figure 2:
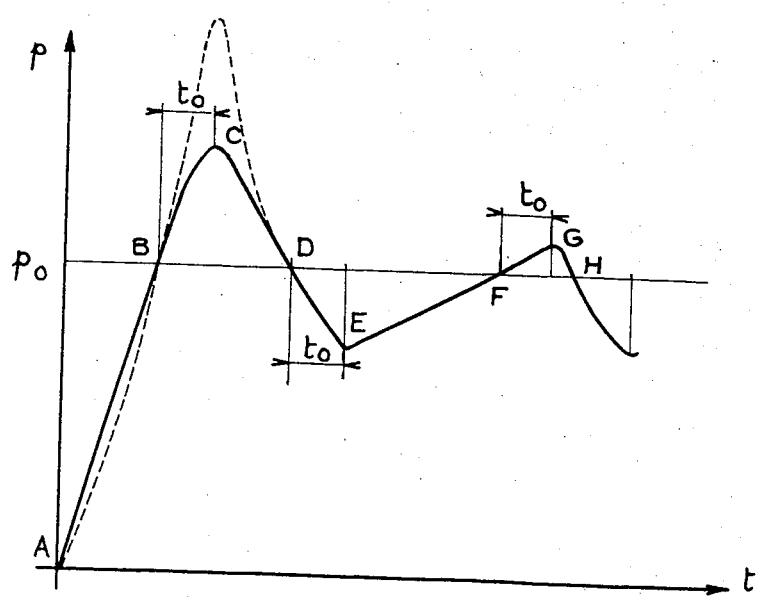
FIG. 2 is a diagram plotting the curve of the operation of the device as a function of the braking pressure.

The operation of the device is illustrated diagrammatically by the curve of FIG. 2 showing the variation in the braking pressure $p$ as a function of time $t$.

As shown in FIG. 2, the line of ordinates $p_o$ corresponds to the critical pressure level whereat the wheels begins to be locked.

Point A designates the beginning of the pressurizing of the braking circuit by the driver depressing the brake pedal 2.

The curve section ABC corresponds to the pressure increment in the circuit.

Point C designates the practical point of operation of detector 46 and the abscissa thereof is somewhat shifted in relation to point B constituting the theoretical point of operation of said detector, of a constant value $_o$ corresponding to the response time of the device.

The curve section CDE corresponds to the pressure expansion in the circuit, and point D to the theoretical stopping of the expansion delayed by the value $t_o$.

The curve section EFG corresponds to the increase in the pressure controlled by throttling passage 23. The gradient of this curve section is considerably lower due to the gradual filling of chamber 22.

The dash-line curve illustrates the same effect as a consequence of a sudden brake application. In this case it will be seen that after a first cycle the pressure oscillates on either side of the critical pressure $p_o$ and that the shorter the response time $t_o$, the smaller these variations. This last condition is obtained through the modulator 26 of which the design is such that it ensures frequency responses comparable to those of an electro-dynamic loudspeaker.

Figure 3:
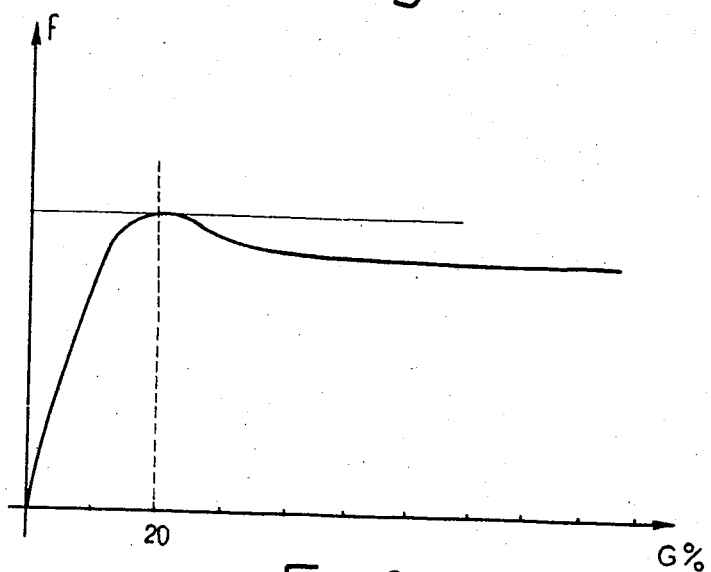
FIG. 3 is another diagram showing the curve representing the coefficient of adherence of the tire on the ground as a function of slip.

In FIG. 3, illustrating the variations in the coefficient of adherence F as a function of slip G in percent, it will be seen that the maximum tire efficiency or adherence is obtained when the slip is of the order of 15 to 20 percent.

Although the present invention has been described with reference to a specific form of embodiment, it will readily occur to those skilled in the art various modifications or the use of equivalent means may be contemplated without departing from the basic principle of the invention as set forth in the appended claims.

WHAT IS CLAIMED AS NEW IS:

1. An anti-lock device for brakes associated with the wheels of vehicles, comprising:
   a source of vacuum;
   a braking circuit expansion unit;
   means for detecting the momentary rotational speed of a wheel;
   means for detecting the momentary speed of the vehicle in relation to the surface upon which the wheels move;
   a detector for transmitting a signal whose magnitude is proportional to the relative slip of a wheel in relation to said surface; said magnitude being above a predetermined value; wherein said detector comprises means for comparing two signals whose magnitudes are proportional to the momentary rotational speed of a wheel and to the actual speed of the vehicle in relation to said surface, respectively;
   and an electromagnetically controlled means for modulating the transmitted signal, said means comprising two connected chambers joined by a variable-volume valve and having a pair of orifices opening into said chambers for connecting said chambers to said expansion unit and said vacuum source, said modulating means interposed between said vacuum source and said locking expansion unit, and said detector connected for energizing said modulating means.

2. Device according to claim 1, characterized in that said chambers are bounded by diaphragms and that the active surface area of one of said diaphragms is identical with the active surface area of the seat of said valve and lower than the active surface area of the other diaphragm.

3. Device according to claim 2, characterized in that said valve comprises an axially movable stem having an extension beyond the volume bounded by said diaphragms and responsive to the unidirectional and permanent action of a spring and to an electromagnetically operable member.

4. Device according to claim 3, characterized in that said modulating means comprises a solenoid the core of which is movable in a magnetic field, and connected for receiving a signal from said detector so as to generate an electromagnetic force proportional to the slip.

5. Device according to claim 1, characterized in that said expansion unit comprises a chamber having a variable volume, an adjustable throttled passage for venting said chamber to the surrounding atmosphere and an orifice opening into said chamber which is connected to the chamber of said modulating means.

* * * * *